(12) United States Patent
Houston

(10) Patent No.: US 8,926,792 B1
(45) Date of Patent: *Jan. 6, 2015

(54) SYSTEM AND METHOD FOR DISPOSING OF LEACHATE AND WASTEWATER

(71) Applicant: Kelly K. Houston, Corneilus, NC (US)

(72) Inventor: Kelly K. Houston, Corneilus, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/305,195

(22) Filed: Jun. 16, 2014

Related U.S. Application Data

(63) Continuation of application No. 14/043,903, filed on Oct. 2, 2013.

(60) Provisional application No. 61/720,864, filed on Oct. 31, 2012.

(51) Int. Cl.
*C02F 1/00* (2006.01)
*C02F 1/52* (2006.01)
*C02F 103/06* (2006.01)

(52) U.S. Cl.
CPC ... *C02F 1/00* (2013.01); *C02F 1/52* (2013.01); *C02F 2103/06* (2013.01); *C02F 2201/008* (2013.01); *C02F 2001/007* (2013.01)
USPC .......... 159/48.1; 159/4.01; 95/205; 261/78.2; 261/115; 210/747.1; 405/52; 405/80; 239/8

(58) Field of Classification Search
USPC .......... 159/4.01, 48.1; 95/205; 261/78.2, 115; 210/747.1; 405/52, 80; 239/8
See application file for complete search history.

(56) References Cited

U.S. PATENT DOCUMENTS

| | | | | |
|---|---|---|---|---|
| 2,768,859 A * | 10/1956 | Patterson | | 239/77 |
| 2,840,300 A * | 6/1958 | Carr | | 415/124.2 |
| 5,726,405 A * | 3/1998 | White | | 210/718 |
| 6,223,995 B1 * | 5/2001 | Evans et al. | | 239/2.1 |
| 6,436,296 B1 * | 8/2002 | White | | 210/719 |
| 6,742,718 B2 * | 6/2004 | Doebler et al. | | 239/67 |
| 7,585,413 B2 * | 9/2009 | Hoffland | | 210/603 |
| 7,604,710 B2 * | 10/2009 | Haslem et al. | | 159/3 |
| 7,622,044 B2 * | 11/2009 | Grott | | 210/638 |
| 7,955,419 B2 * | 6/2011 | Casella | | 95/136 |
| 8,256,748 B1 * | 9/2012 | Boulter | | 261/28 |

(Continued)

*Primary Examiner* — Prem C Singh
*Assistant Examiner* — Jonathan Miller
(74) *Attorney, Agent, or Firm* — Coats and Bennett PLLC

(57) ABSTRACT

A method for on-site dissemination and disposal of all wastewaters or leachate, that is generated by a landfill or other wastewater generating site includes collecting the wastewater or leachate which comprises an aqueous solution, having solids, elements and compounds of concern therein. The wastewater or leachate is directed to an "Integrated Mobile Aerosolization System (IMAS)" having a turbine and being integrated and mobile. The turbine is driven so as to generate a fully integrated and mobile system of highly accelerated air that moves through the IMAS. An integrated pump is utilized to move the leachate or wastewater to a series of nozzles that aerosolizes the leachate or wastewater into the path of the system of air to form an air-wastewater mixture or an air-leachate mixture. Thereafter, the mixture is directed from the IMAS and aerosolized over an area such as a landfill or other wastewater generating site such that a substantial portion of the wastewater or leachate is aerosolized and the solids, elements or compounds of concern contained in the leachate or wastewater fall onto a designated area of the landfill or on a specific area such as an unlined or lined catch basin or lagoon that is intended to contain leachate or other wastewaters.

19 Claims, 4 Drawing Sheets

(56) References Cited

U.S. PATENT DOCUMENTS

| | | | |
|---|---|---|---|
| 8,524,089 B2 * | 9/2013 | Tsai | 210/703 |
| 8,636,267 B1 * | 1/2014 | Boulter | 261/28 |
| 8,657,941 B2 | 2/2014 | Hutchinson | |
| 8,740,195 B2 * | 6/2014 | Schneider et al. | 261/122.1 |
| 2007/0102154 A1 * | 5/2007 | Grott | 166/266 |
| 2007/0186778 A1 * | 8/2007 | Peterson | 96/281 |
| 2012/0152850 A1 * | 6/2012 | Tsai | 210/703 |
| 2013/0233782 A1 * | 9/2013 | Eppink et al. | 210/209 |

* cited by examiner ic
SYSTEM AND METHOD FOR DISPOSING OF LEACHATE AND WASTEWATER The present application is a continuation of U.S. patent application Ser. No. 14/043,903 filed Oct. 2, 2013, which claims priority under 35 U.S.C. §119(e) from U.S. Provisional Application Ser. No. 61/720,864 filed on Oct. 31, 2012. These applications are incorporated in their entirety by reference herein.

FIELD OF THE INVENTION

The present invention relates to onsite systems and processes for disseminating and disposing of leachate from landfills and other wastewaters. The present invention also relates to systems and processes for disposing of other aqueous solutions such as wastewater through a process where the aqueous solution is aerosolized.

BACKGROUND OF THE INVENTION

Landfill leachate is the percolation and runoff water that occurs from and within landfills. Landfill leachate is contaminated and typically includes dissolved organic matter, inorganic matter, heavy metals and a host of other known and unknown contaminants. Landfill leachate or other wastewaters are generally regulated by federal, state and local environmental agencies. These agencies have declared landfill leachate and other wastewaters to be a threat to local rivers, streams and soils, as well as municipal water supplies and ground water located in the general vicinity of landfills or other wastewater generating sites.

Offsite transportation, treatment and disposal of landfill leachate and other declared wastewaters is expensive and inefficient. Typically leachate and other wastewaters are collected and may be transported off-site to a treatment facility. Leachate and other wastewaters are typically collected in ponds or tanks and may be transferred to trucks that transport the leachate and other wastewaters to prepared wastewater treatment plants. It is the collection, transportation and treatment that makes the process extremely expensive. It is not unusual for a typical size landfill to spend approximately $1 million dealing with leachate or other wastewaters either on or off site, annually.

SUMMARY OF THE INVENTION

In one embodiment, the present invention relates to a process for onsite and mobile aerosolization of leachate and other generalized wastewaters. In one embodiment of the present invention, leachate is directed to a mobile, self-contained and complete, high output air/water cannon that includes an adjustable turbine and a set of adjustable and interchangeable nozzles. The turbine can be either a diesel motor, or electric generator driven and is directly integrated with the turbine, creating a system of air and leachate and other wastewaters which flows in front of a wind stream created by the turbine. The motor, turbine and an integrated pump are all combined to create a unified, complete and mobile leachate and wastewater system that is capable of disseminating, and disposing of leachate, or other wastewaters, on the site where it was generated. Landfall leachate, or other wastewaters, are pumped under pressure past the nozzles and the nozzles spray the leachate or wastewater into the path of the turbine system's high output of air flow. This forms a mobile and controllable mixture of air-leachate or air-wastewater that can be disseminated and disposed of on the site where the leachate or other wastewater was generated. The "integrated and mobile aerosolization system (IMAS)" propels the mixture of air-leachate or air-wastewater over the lined landfill, designated area or other wastewater collection area. Much of the mixture is aerosolized. However, the air-leachate mixture or air-wastewater mixture includes solids and other elements or compounds of concern that fall out in the aerosolization process. Typically, in the case of a landfill or other general wastewater aerosolization application, for example, the solids, elements or compounds, which fall out onto the landfill surface or lined area may promote the growth of vegetation.

In another particular embodiment, wastewater contained in an unlined or lined containment area or lagoon is pumped or directed to the "IMAS." The wastewater is pumped under pressure into the IMAS and finally through the nozzles for dissemination and onsite disposal. The nozzles emit an aerosol that is mixed and accelerated with the IMAS's airflow which forms an air-wastewater mixture. The IMAS is mobile and thus positioned and directed to propel the mixture of air-wastewater over the unlined or lined catch basin, lagoon, for example, where a substantial portion of the wastewater aerosolizes into the atmosphere while solids, elements and compounds of concern contained in the wastewater fall out into the unlined or lined catch basin, lagoon or other areas.

Other objects and advantages of the present invention will become apparent and obvious from a study of the following description and the accompanying drawings which are merely illustrative of such invention.

DESCRIPTION OF EXEMPLARY EMBODIMENTS

Figure 1:
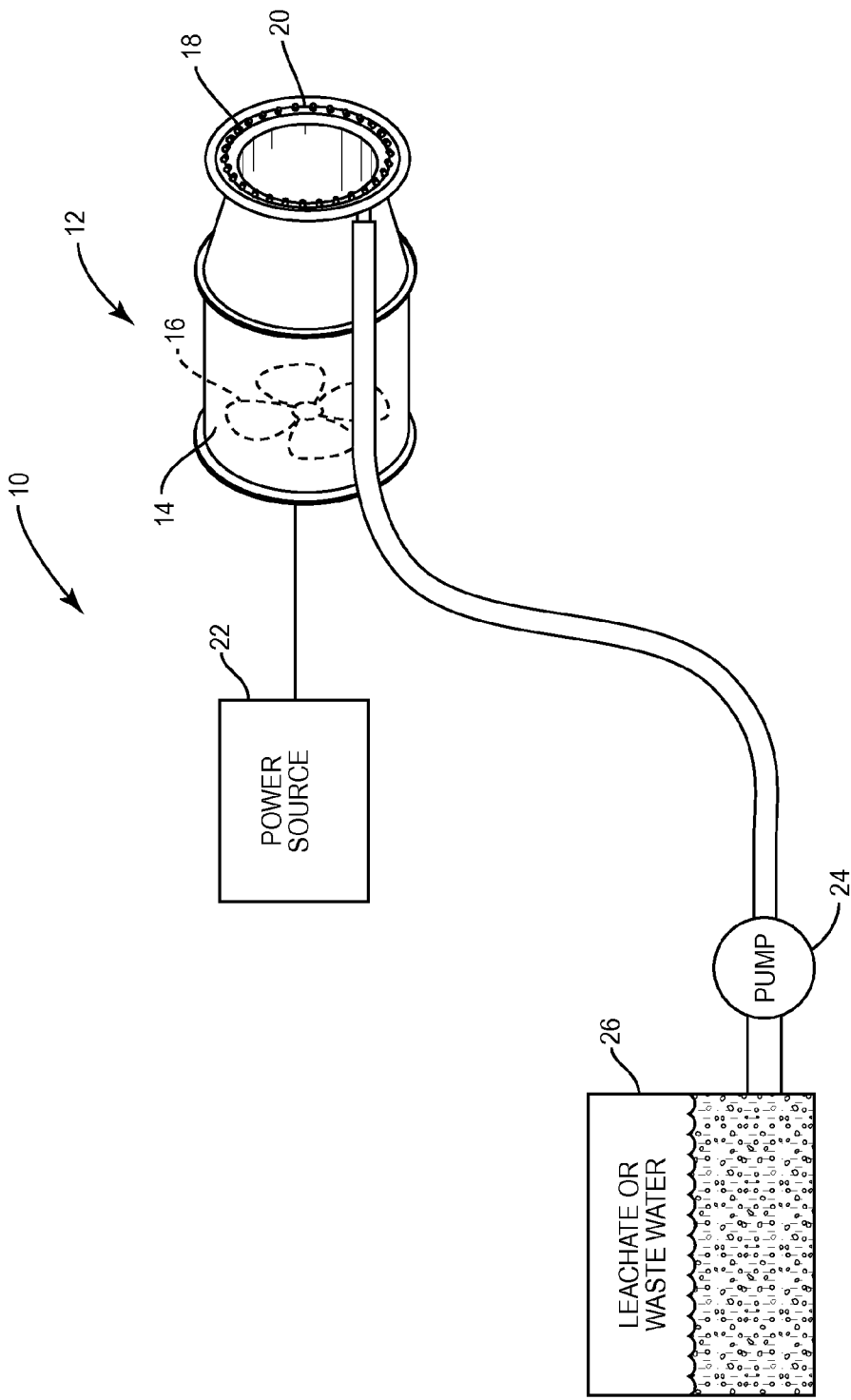
FIG. 1 is a schematic illustration for a system for aerosolizing wastewater, such as landfill leachate or other wastewater, onsite and with an IMAS.
Figure 2:
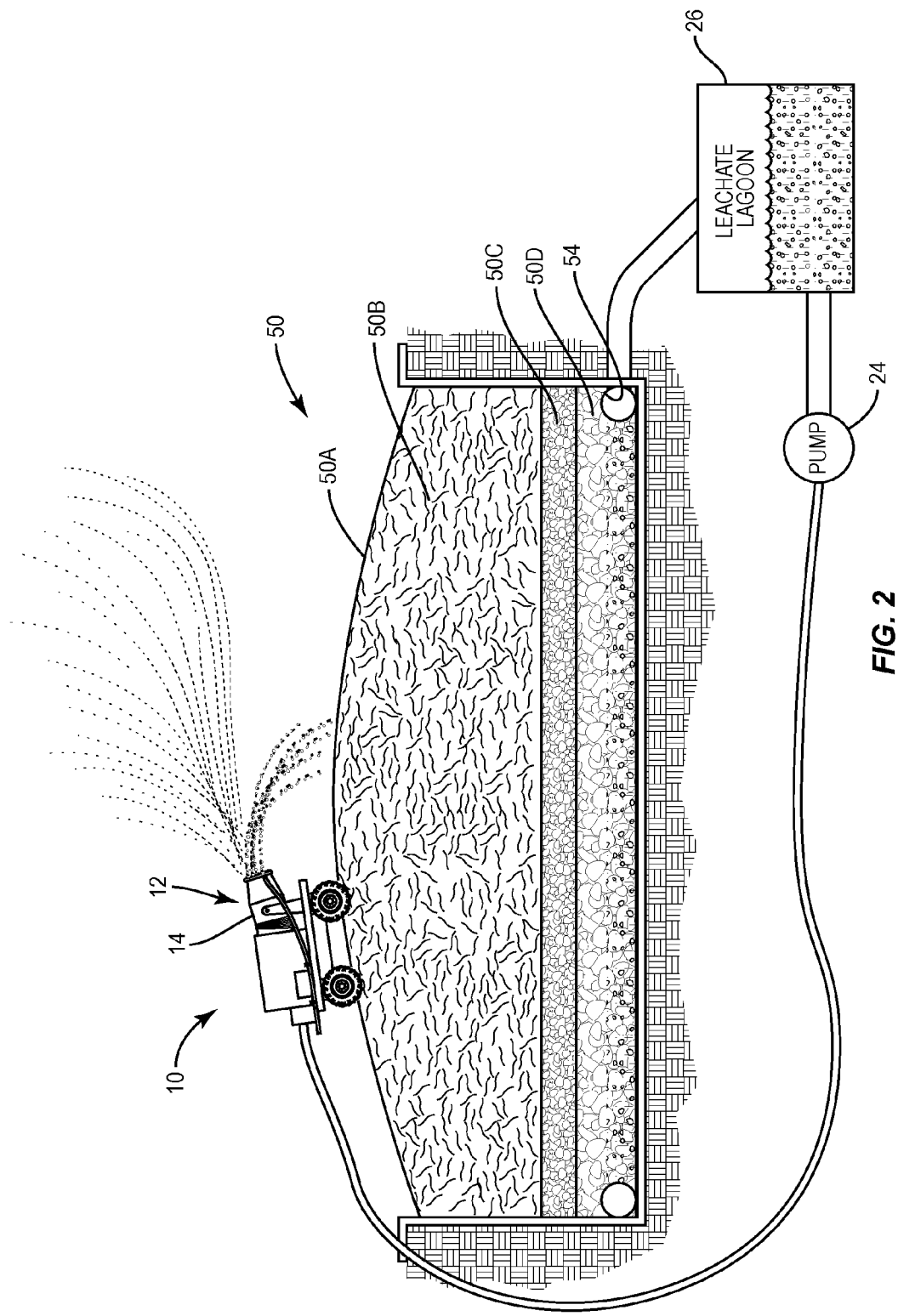
FIG. 2 is a schematic illustration of a landfill illustrating the basic process of utilizing an IMAS to aerosolize a portion of the leachate while at the same time permitting solids contained in the leachate to fall out onto the landfill area.

With further reference to the drawings, FIG. 1 shows a system for disseminating and dispersing of various types of wastewater and is indicated generally by the numeral 10. As will become apparent from the present disclosure, system 10 is used for disseminating and disposing of wastewater such as leachate, lagoon liquid waste, "frac flowback", other wastewaters, etc. Turning specifically to FIG. 1, the system 10 is shown therein includes an IMAS indicated generally by the numeral 12. IMAS 12 includes a conduit 14 that is configured to channel or direct air through the same. A relatively large turbine 16 is contained in the conduit 14 and is rotatively mounted on a shaft and forms a part of the IMAS 12. As will be appreciated from subsequent portions of the disclosure, turbine 16 is driven such that it generates a system of air that moves through the conduit, from an inlet end to and through an outlet end. IMAS 12 also includes a wastewater injection system for aerosolizing wastewater and injecting the aerosolized wastewater into the system of air passing through the conduit 14. This IMAS contains a series of adjustable and replaceable nozzles 18 that are secured and circumferentially spaced around a ring pipe or manifold 20. As will be appreciated from subsequent portions of the disclosure, wastewater being aerosolized by the IMAS 12 is directed under pressure into the manifold 20 and from the manifold the wastewater is aerosolized outwardly from the series of nozzles 18. As seen in FIG. 2, the nozzles are oriented about an outlet end portion of the conduit 14. Further, the nozzles 18 are directed inwardly such that the aerosolized wastewater is directed inwardly towards the center of the conduit 14. As discussed later herein, the aerosolized wastewater mixes with the system of air passing through the conduit to form an air-wastewater mixture. In one embodiment, as discussed below, the wastewater is leachate produced by a landfill. The leachate is aerosolized by the nozzles 18 and injected into the stream of air passing through the conduit 14.

To provide power to the IMAS 12 and particularly to drive the turbine 16, there is provided an integrated power source 22. Various types and forms of power sources can be utilized. In one embodiment the power source is a diesel or gasoline internal combustion engine that is operatively connected to a drive shaft that drives the turbine 16. In another embodiment, the power source can be comprised of an electric motor operatively connected to the drive shaft of the turbine 16 and wherein the electric motor is powered by an integrated and conventional generator.

Also forming a part of the system 10 is one or more integrated pumps 24. The function of the one or more pumps 24 is to pump the wastewater under pressure into the manifold 20 and out the respective nozzles 18. In addition, the system 10 will include, in some embodiments, a tank or storage vessel for holding the wastewater to be disseminated. The holding tank is shown in FIG. 1 and referred to by the numeral 26.

FIG. 1 shows the conduit 14, as well as the circumferentially spaced nozzles 18, disposed around the outlet end of the conduit 14. As discussed above, air plus wastewater is injected into the air stream forms an air-water mixture. The air functions at least partially as a carrier for the aerosolized wastewater. In addition, because of the velocity and energy associated with the moving stream of air that is being propelled from the outlet end of the conduit end 14, the system of air facilitates the further aerosolization of the wastewater. The IMAS 12 can be designed to throw the air-wastewater mixture a substantial distance from the outlet end of the IMAS. Typically, but not always, the IMAS 12 is mounted on a mobile platform such that it can be moved from point to point. Further, the conduit 14 is typically adjustably mounted on the platform such that it can be rotated 360° around the platform and also can be rotated up and down such that the conduit can effectively direct a stream of air including the aerosolized wastewater a substantial distance from the outlet end of the conduit 14. In some embodiments, the power imparted to the turbine 16 is operative to direct the air-wastewater mixture as much as 200 meters. Thus, with the numerous adjustment features associated with the conduit 14, the conduit can be aimed and directed in an infinite number of directions.

Various types of IMAS's can be utilized to disseminate and dispose of wastewaters or leachate on the site where it was generated. For example, some forms of snow blowing, dust suppression or odor suppression machines can be utilized to disseminate the wastewater. In the way of an example, one is referred to the dust suppression machine shown in WO2011/119229, the disclosure of which is expressly incorporated herein by reference.

The wastewater or leachate typically includes suspended solids and in some cases precipitated solids. That is, the wastewater or leachate may include dissolved solids that through possible chemical treatment prior to reaching the IMAS 12 causes the dissolved solids to precipitate. Thus, in some cases, the wastewater or leachate includes both suspended solids and precipitants. The basic approach for treating wastewater or leachate is to direct the air-wastewater or air-leachate mixture from the outlet end of the conduit 14 such that the aqueous or water portion of the wastewater or leachate aerosolizes into the atmosphere. At the same time, the object is to permit the solids in the wastewater or leachate to fall out of the air-wastewater stream onto a pre-selected unlined or lined area. As will be discussed later, in the case of disseminating and disposing of leachate from a landfill or other wastewater on site, it may be desirable to position the IMAS 12 such that solid minerals in the form of nitrogen, calcium or phosphorous compounds, for example, will fall out onto an area such that they may promote the growth of vegetation.

Turning to FIG. 2, shown therein is a particular application of the present invention. In this case, the IMAS 12 is utilized to disseminate and dispose of leachate produced by a landfill indicated generally by the numeral 50. Before describing the process in more detail, it may be beneficial to briefly discuss the landfill site 50. As illustrated in FIG. 2, the landfill site 50 includes an upper surface 50A. Disposed below the upper surface 50A is a depth of soil, trash, liner, filtering systems, etc. (50B) that is continually mixed and turned during the course of the operation of the landfill. Although the particular structure of a landfill can vary from location to location, in one embodiment there is provided a layer of gravel or sand 50C beneath the upper soil and trash layer and perhaps other linings or catch membranes. Below the layer of gravel is a layer of rock 50D and below the layer rock is usually clay and is a retaining liner or other catch membranes. The liner(s) may stretch across the entire dimensions of the landfill and is basically utilized to retain and prevent leachate from moving further downwardly into the underlying soil. A network of drain pipes 54 is typically employed just above the liner(s) and is utilized to collect the leachate and channel the leachate to a holding tank, catch basin or lagoon. Once in the holding area, the leachate can be disseminated and disposed of continuously or periodically. In order to disseminate and dispose of the leachate, one or more pumps 24 are utilized to pump the leachate from the holding area 26 to the IMAS 12. More particularly, the one or more pumps pump the leachate into the manifold 20 disposed about the outlet end of the conduit 14. Once in the manifold 20, the leachate under pressure is forced out the circumferentially spaced nozzles 18 into the path of a system of air that is generated by the turbine 16 and the conduit 14. As noted above, as this system or stream of air exits the outward end of the conduit 14, aerosolized leachate mixes with the directed air to form the air-leachate mixture. The pressure applied to the leachate upstream of the nozzles can vary. In one example, the pressure is maintained between 50 psi and 150 psi. Further, the nozzles can be selected by a person of ordinary skill in the art to provide the degree of aerosolization necessary or appropriate to optimize the efficiency of the IMAS 12.

As seen in FIG. 2, in one embodiment the IMAS 12 is placed at the apex or center of the landfill site 50. From that point, the conduit 14 can be moved and manipulated over time to direct the air-leachate mixture over substantially the entire upper surface 50A of the landfill area. As noted above, in one example the throw of the IMAS 12 may be as much as 200 meters. Thus, as illustrated in FIG. 2, a substantial portion of the aerosolized leachate entering the stream of air will effectively be aerosolized into the atmosphere above and around the landfill site 50. As much as 70-80 percent of the leachate is aerosolized into the atmosphere. As also noted above, the leachate will include solids that will fall out of the air stream within a shorter distance. For example, some solids would be expected to fall out in the area of 5 to 150 meters from the outlet end of the conduit 14. These solids can range from calcium and phosphorus compounds to other minerals, elements or compounds that might aid in the growth and proliferation of vegetation.

The range of the IMAS 12 can vary. It can vary based on active controls or it might vary based on environmental conditions. In one example, the speed of the turbine 16 can be varied so as to adjust the velocity of the air and the energy imparted to the air. That will effectively control or adjust the throw from the outlet end of the conduit 14. In addition, the flow rate and pressure of the leachate going to and within the IMAS can be varied also. This will vary the degree of aerosolization and, it is postulated, will vary the efficiency of the overall leachate aerosolization process. As a general rule, the higher the pressure for a given nozzle, the greater the aerosolization of the leachate and the greater the aerosolization efficiency.

As noted above, in one environment, the IMAS 12 is mounted on a mobile platform and can be moved from location to location about the landfill or site. This, again, enables the solids contained in the leachate to be intentionally and uniformly spread over the entire upper surface 50A of the landfill. In addition, it may be advisable under certain conditions to position the IMAS 12 around the periphery of the landfill. That is, the mobile platform could be positioned at various points around the periphery of the landfill with the outward end of the conduit 14 aimed up a slope of the landfill. This may improve the retention of solids on the upper surface 50A of the landfill and, depending on the composition and amount of liquid that actually falls out of the air-leachate mixture, this can minimize "washing" and the formation of small gullies that run down the sides of the landfill.

Figure 3:
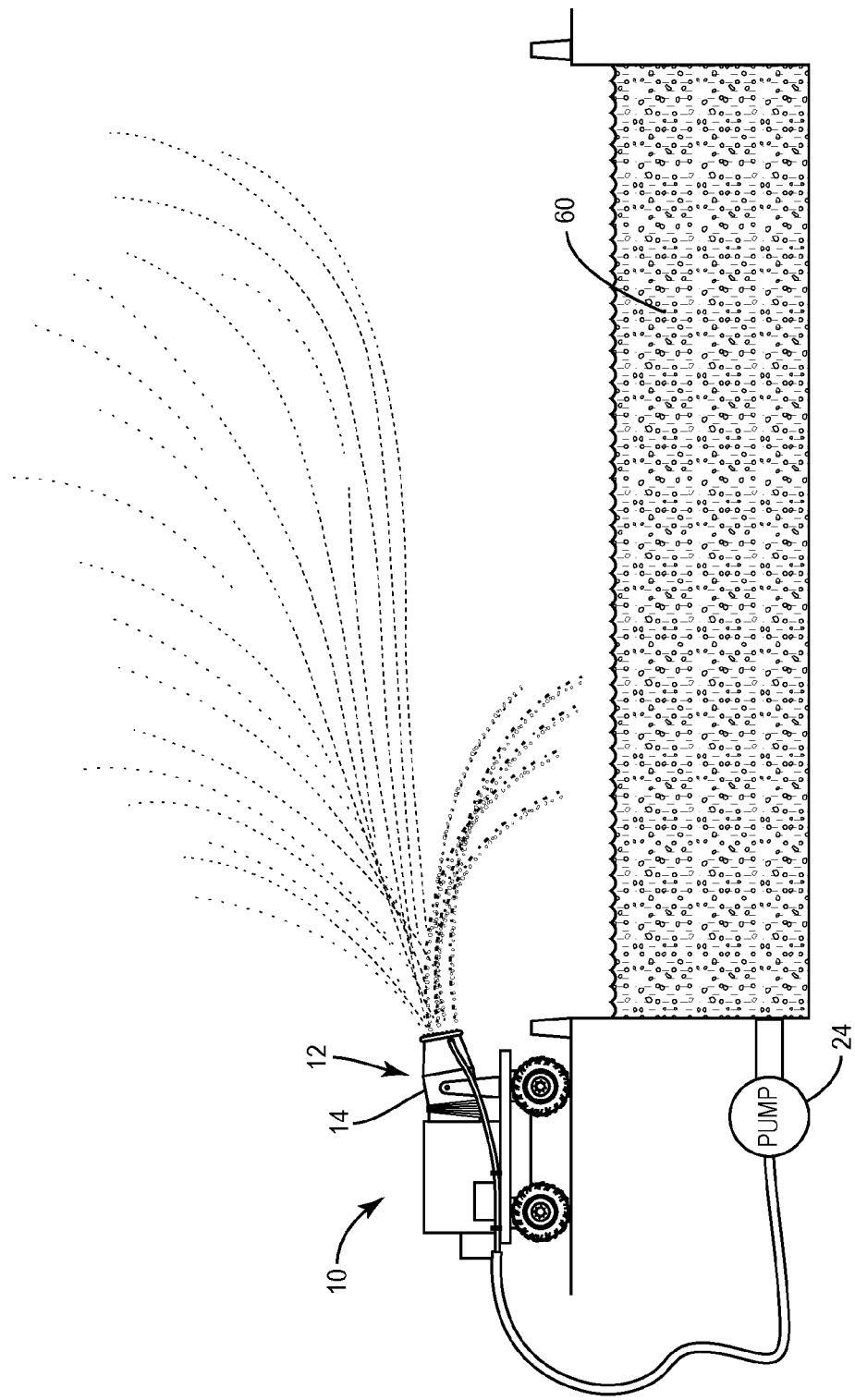
FIG. 3 is a schematic illustration showing the IMAS and process of the present invention being utilized to treat wastewater in an unlined or lined catch basin or lagoon.
Figure 4:
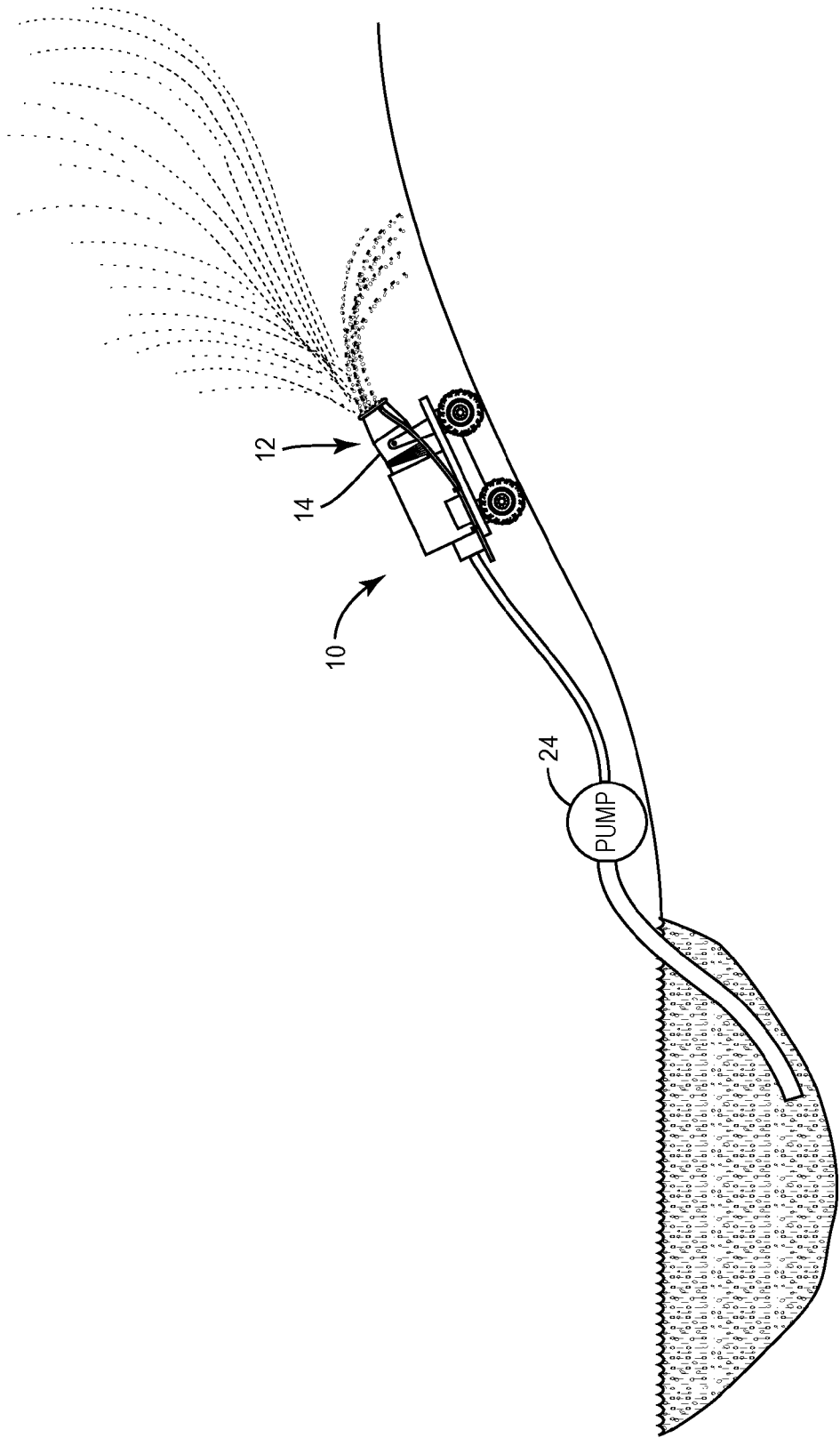
FIG. 4 is a schematic illustration similar to FIG. 3 showing the IMAS and the process of the present invention being utilized to treat wastewater in a pond, lagoon or holding area where the wastewater is aimed over an area in the proximity of the pond, lagoon or wastewater holding area.

Turning to FIG. 3, there is shown an example of utilizing the IMAS 10 of the present invention to disseminate and dispose of wastewater. In this case, the wastewater is contained within a catch basin or lagoon 60. The IMAS 12 is positioned adjacent an edge of the catch basin or lagoon 60. Wastewater in the catch basin or lagoon is pumped by one or more pumps 24 to the IMAS 12 and more particularly to the manifold 20 and the nozzles 18 supported thereon. The wastewater, under pressure, is forced out the nozzles 18 and directed inwardly towards the passing air stream generated by the turbine 16. This forms the air-wastewater mixture.

The outlet end of the conduit 14 is aimed over the catch basin or lagoon. Thus, the aerosolized wastewater in the air-wastewater mixture tends to be further aerosolized as it moves with the air stream outwardly over the catch basin or lagoon. This enables a substantial portion of the wastewater, in some cases as much as 70%, to be aerosolized into the atmosphere over the catch basin or lagoon 60 or any other selected area. At the same time, the wastewater will include solids which may include both suspended solids and precipitated solids. These solids tend to quickly fall out of the air-wastewater mixture over the catch basin or lagoon. Thus, the solids quickly fall back into the catch basin or lagoon and eventually can be disseminated or disposed of by other appropriate means.

From the foregoing specification and discussion, it is seen that the process or method of the present invention is an efficient way of disseminating and disposing of wastewaters. It is effective and efficient because substantial portions of the aqueous or liquid portions of the wastewater are effectively aerosolized into the atmosphere. Still, the method or process of the present invention effectively deals with solids and particularly solid contaminants because their disposition in the fallout can be controlled and where appropriate can be utilized in constructive and helpful ways such as in the case of leachate or other wastewaters where valuable minerals, elements or compounds are utilized as an effective fertilizer to promote the growth of onsite vegetation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of disseminating and disposing of wastewater having suspended solids:
   directing the wastewater to an integrated and mobile aerosolization system (IMAS);
   driving a turbine associated with the IMAS and generating a system of air that moves through the IMAS;
   pumping the wastewater under pressure to a series of nozzles associated with the IMAS and aerosolizing the wastewater directed from the nozzles into the system of air passing through the IMAS to form an air-wastewater mixture; and
   directing the air-wastewater mixture from the IMAS and spraying the air-wastewater mixture over a solids collection area where the suspended solids in the wastewater fall out of the air-wastewater mixture onto the solids collection area.

2. The method of claim 1 wherein the solids collection area is an unlined or lined catch basin or lagoon and the method includes pumping the wastewater from the unlined or lined catch basin or lagoon to the IMAS and aerosolizing the air-wastewater mixture over the unlined or lined catch basin or lagoon.

3. The method of claim 1 wherein the solids collection area is an area where the wastewater is located.

4. The method of claim 1 including directing the system of air through a conduit forming a part of the IMAS and aerosolizing the wastewater inwardly from a ring pipe having the nozzles disposed thereon such that the wastewater is directed inwardly into the system of air passing through the conduit of the IMAS.

5. The method of claim 1 including directing the system of air through a conduit forming a part of the IMAS and rotating the conduit while spraying the air-wastewater mixture over the solids collection area.

6. The method of claim 1 wherein the IMAS is mounted on a mobile platform and the method includes moving the IMAS from one location to another.

7. The method of claim 1 wherein the solids collection area includes a catch basin, lagoon or other wastewater holding area and the method includes positioning the IMAS adjacent an edge of a catch basin, lagoon or other water holding area having wastewater therein; and pumping the wastewater from the catch basin, lagoon or other wastewater holding area to the nozzles of the IMAS; and wherein the air-wastewater mixture is aimed over the catch basin, lagoon or other wastewater holding area.

8. A method of disseminating and disposing of leachate comprising:
   collecting the leachate which comprises an aqueous solution having suspended solids therein;

directing the leachate under pressure to an aerosolization system that includes a turbine;

driving the turbine of the aerosolization system and generating a system of air that moves through a conduit associated with the aerosolization system;

pumping the leachate under pressure to a series of nozzles and aerosolizing the leachate into the path of the system of air passing through the conduit to form an air-leachate mixture; and directing the air-leachate mixture from the aerosolization system and over a solids collection area and causing the solids in the leachate to fall out of the air-leachate mixture onto the solids collection area.

9. The method of claim 8 wherein collecting the leachate includes channeling the leachate to a tank, catch basin or lagoon and holding the leachate therein.

10. The method of claim 8 wherein the aerosolization system includes an integrated and mobile aerosolization system (IMAS) and the method includes stationing the IMAS on a landfill and moving the IMAS from one location to another in order to aerosolize the leachate over the landfill.

11. The method of claim 10 wherein the IMAS is fully integrated and mobile and the method includes moving the IMAS from point-to-point on the landfill.

12. The method of claim 8 including maintaining the pressure of the leachate directed to the nozzles at 50-150 psi.

13. The method of claim 8 wherein a ring pipe having the nozzles associated therewith is disposed in the conduit and the method includes aerosolizing the leachate inwardly from the ring pipe and nozzles such that the aerosolized leachate is directed inwardly into the system of air passing through the conduit of the aerosolization system.

14. The method of claim 8:
wherein the aerosolization system comprises an integrated and mobile aerosolization system;

wherein collecting the leachate includes channeling the leachate from a landfill to a tank, catch basin or lagoon and holding the leachate therein;

the method further including stationing the IMAS on the landfill and moving the IMAS from one location to another to aerosolize the air-leachate mixture over the landfill; and wherein the IMAS is fully integrated and mobile and the method includes moving the IMAS from point-to-point on the landfill.

15. A method of disseminating and disposing of wastewater having suspended solids comprising:

(a) directing the wastewater to an aerosolization system having a turbine and one or more nozzles;

(b) driving the turbine and generating a system of air that moves past the nozzles;

(c) pumping the wastewater under pressure to the nozzles and aerosolizing the wastewater and suspended solids emitted from the nozzles;

(d) mixing the aerosolized wastewater and suspended solids with the system of air generated by the turbine to form an air-wastewater mixture;

(e) directing the air-wastewater mixture from the aerosolization system and over a solids collection area; and (f) wherein, as the air-wastewater mixture is directed over the collection area, suspended solids in the air-wastewater mixture fall out of the mixture onto the collection area while a substantial portion of the wastewater aerosolizes into the atmosphere.

16. The method of claim 15 wherein the aerosolization system includes a conduit and a ring pipe disposed inside of the conduit and adjacent an interior surface of the conduit such that an open area is defined interiorly of the ring pipe and where the one or more nozzles includes a series of nozzles provided on the ring pipe; and wherein the method includes directing the wastewater under pressure into the ring pipe and around the ring pipe and into the nozzles mounted on the ring pipe and directing the aerosolized wastewater inwardly from the ring pipe and the nozzles and mixing the aerosolized wastewater with the system of air passing through the open area defined interiorly of the ring pipe.

17. The method of claim 15 wherein the wastewater comprises leachate and the method includes pumping the leachate under pressure to the nozzles and aerosolizing the leachate emitted from the nozzles.

18. The method of claim 17 wherein the leachate is produced by a landfill and the method includes collecting the leachate produced by the landfill and wherein the solids collection area includes at least a portion of the landfill and wherein the air-wastewater mixture comprises an air-leachate mixture and wherein as the air-leachate mixture is directed over the landfill the suspended solids in the air-leachate mixture fall out of the mixture onto the landfill while a substantial portion of the air-leachate mixture aerosolizes into the atmosphere.

19. The method of claim 15 wherein the aerosolization system comprises an integrated and mobile aerosolization system (IMAS).

* * * * *